United States Patent [19]

Clausen

[11] Patent Number: 4,493,820
[45] Date of Patent: Jan. 15, 1985

[54] PROCESS FOR PARTIAL REMOVING OF IMPURITIES FROM A WET PROCESS PHOSPHORIC ACID

[75] Inventor: Herbert J. Clausen, Apollo Beach, Fla.

[73] Assignee: Gardinier, Inc., Tampa, Fla.

[21] Appl. No.: 432,297

[22] Filed: Oct. 1, 1982

[51] Int. Cl.³ .......................... C01B 25/28; C02B 7/00
[52] U.S. Cl. ........................................ 423/310; 71/34;
   71/43; 210/787; 210/805; 423/313; 423/321 R
[58] Field of Search ................. 71/34, 43; 423/321 R,
   423/471, 310, 313; 210/906, 781, 787, 805;
   55/228, 40

[56] References Cited

U.S. PATENT DOCUMENTS

| | | | |
|---|---|---|---|
| 2,142,406 | 1/1959 | Nonhebel et al. | 55/228 |
| 3,677,734 | 7/1972 | Carroll et al. | 71/43 |
| 3,988,140 | 10/1976 | Burns et al. | 423/313 |
| 4,028,087 | 6/1977 | Schultz et al. | 71/43 |
| 4,102,657 | 7/1978 | Mehta | 55/228 |
| 4,154,593 | 5/1979 | Brown et al. | 74/34 |
| 4,343,780 | 8/1982 | Wolstein et al. | 210/787 |

Primary Examiner—Peter Hruskoci
Attorney, Agent, or Firm—Cushman, Darby & Cushman

[57] ABSTRACT

A process for the partial removal of impurities present in a wet process phosphoric acid used in the production of granulated mono- or di-ammonium phosphate fertilizers in order to control the grade of the final product. All or a portion of the liquid from the primary scrubbers is clarified to remove the precipitated impurities and the clarified flow is then fed into the reactor along with any unclarified portions of the primary scrubber liquid.

6 Claims, 4 Drawing Figures

EFFECT OF CLARIFIED/UNCLARIFIED SCRUBBER LIQUID RATIO ON THE N-CONTENT OF DI-AMMONIUM PHOSPHATE (18-46)(CALCULATED)

PROCESS FOR PARTIAL REMOVING OF IMPURITIES FROM A WET PROCESS PHOSPHORIC ACID

FIELD OF THE INVENTION

The present invention is directed to a novel and useful process to manufacture granulated high grade ammoniated phosphates from impure wet process phosphoric acid by partially removing impurities from the primary scrubber liquid of an ammoniated phosphates plant.

BACKGROUND OF THE INVENTION

Typically, ammonium phosphate fertilizers are produced from wet process phosphoric acid. For several years the quality of phosphate rock being mined in Florida has been declining. This is important because wet process phosphoric acid is produced by decomposing natural phosphate rock with sulfuric acid and filtering off the precipitated calcium sulfate. Depending upon the quality of the phosphate rock processed, the resulting crude phosphoric acid solution contains varying amounts of impurities such as iron, aluminum, magnesium, calcium and other metals in the form of their phosphates. The impurities act as diluents during the manufacture of ammoniated phosphate fertilizers and often prevent obtaining the required grade specifications pertaining to nitrogen and available phosphate content. Consequently, the wet process phosphoric acid manufactured from the phosphate rocks has become increasingly impure. As a result, it has become increasingly more difficult to produce and maintain industry acceptable grades of ammonium phosphate fertilizers.

The impurities in the wet process phosphoric acid which cause the greatest problems are primarily iron, aluminum and magnesium phosphate which replace hydrogen ions, thereby leaving fewer hydrogen ions available for ammoniation. Additionally, some of the impurities, primarily iron, form upon ammoniation insoluble phosphate compounds thereby reducing the available $P_2O_5$ content of the ammonium phosphate fertilizer.

Tests of the remaining phosphate rock deposits in central Florida indicate that the quality of the rock will decline even further. This will make it even more difficult, if not impossible, to produce the currently acceptable grades of ammonium phosphate fertilizers.

Thus, it is the object of the present invention to provide a process for removing at least a portion of the impurities in wet process phosphoric acid, and thus maintaining the grade of granulated mono- or di-ammonium phosphates at the current acceptable industry standards.

Another object of our invention is to provide a processing step that can be integrated into existing ammonium phosphate plants and permits the partial and controlled removal of the above-mentioned impurities. For economic reasons it is benefical to remove only as much of the impurities as is necessary to insure the grade specifications of the desired di-ammonium or non-ammonium phosphate products.

SUMMARY OF THE INVENTION

Wet process phosphoric acid is produced by decomposing natural phosphate rock with sulfuric acid and filtering off the precipitated calcium sulfate. Depending upon the quality of the phosphate rock processed, the resulting crude phosphoric acid solution contains varying amounts of impurities such as iron, aluminum, magnesium, calcium and other metals in the form of their phosphates. These impurities act as diluents during the manufacture of ammoniated phosphate fertilizers and often prevent obtaining the required grade specifications pertaining to nitrogen and available phosphate content.

The present invention provides a process that can be integrated into existing ammonium phosphate plants and permits the partial and controlled removal of the above-mentioned impurities. For economic reasons it is beneficial to remove only as much of the impurities as is necessary to insure the grade specification of the desired di-ammonium or mono-ammonium phosphate products.

To remove the impurities from the phosphoric acid by physical means such as centrifugation or filtration, the impurities first must be precipitated. This occurs in the primary scrubbers where phosphoric acid is used to remove and recover ammonia, primarily from the reactor and granulator off-gases. The degree of ammoniation, of which the N:P mole ratio is an indicator, determines the completeness of the precipitation. An increase in the N:P mole ratio causes more impurities to precipitate which can then be removed by clarification.

The impurities remaining in solution at a given N:P mole ratio remain constant regardless of the initial impurity content of the scrubber liquid. Thus, the quantity of impurities removed from the scrubber liquid is a function of the following:

(a) The initial impurities content of the scrubber liquid;

(b) The N:P mole ratio of the scrubber liquid;

(c) The amount of scrubber liquid clarified; and (d) The efficiency of the clarifying equipment.

In a typical ammonium phosphates process, an approximate 42.5% $P_2O_5$ phosphoric acid is reacted with either gaseous or liquid ammonium in a vertical reactor. The resultant ammonium phosphates slurry is then pumped to a granulator, e.g., a rotating drum or pugmill where it is distributed onto dry recycled granulated ammonium phosphates. The wetted granules are further ammoniated and discharged into a rotary dryer where excess water is evaporated. Granules having the desired product size are separated out, cooled and set to storage, and the off size granules are segregated for use as recycle material.

The off-gases from the reaction step and the granulation step which includes the steps of drying, size separation and cooling are scrubbed in a primary scrubber, or primary scrubbers, with phosphoric acid to remove ammonia, and ammonium phosphate dust. The liquid from the primary scrubber is then fed to the reactor.

In the process of the present invention, all or a portion of the primary scrubber liquid is sent to a clarification stage to remove precipitated impurities from the primary scrubber liquid. This clarification can be effected by any of the known ways including settling, filtration or centrifuging. The clarified primary scrubber liquid is then fed into the reactor together with any portion of primary scrubber liquid which is not clarified where they are mixed with approximate 46% phosphoric acid and ammoniated.

The precipitated impurities removed from the primary scrubber liquid by the clarification step consists primarily of complexed iron, aluminum and magnesium phosphates containing small amounts of nitrogen. These impurities can then, if desired, be processed in a triple superphosphate plant.

The grade of the ammonium phosphates product can be effectively controlled in the process of the present invention by either varying the N:P$_2$O$_5$ mole ratio of the primary scrubber liquid and/or by varying the percentage of the primary scrubber liquid processed through the clarification step.

DETAILED DESCRIPTION OF THE DRAWINGS AND THE INVENTION

Figure 1:
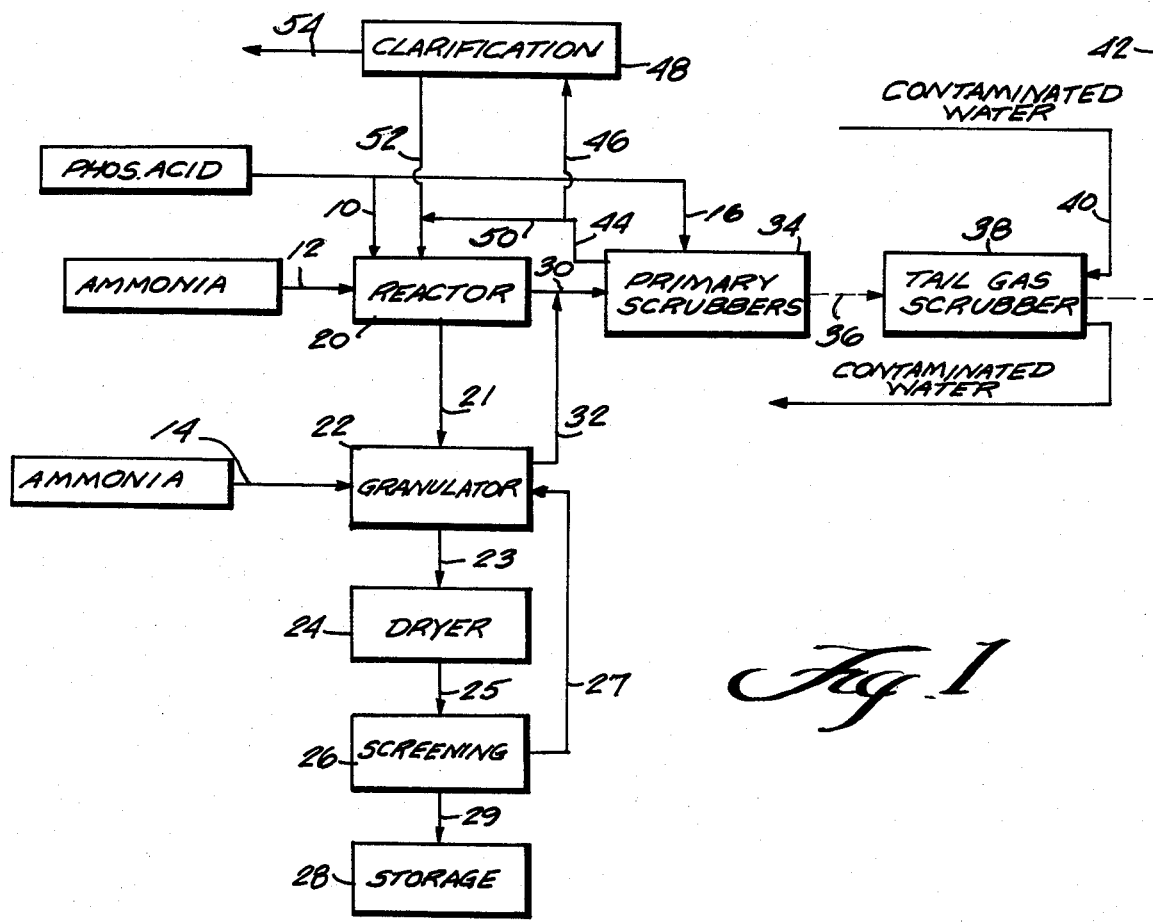
FIG. 1 is a flow sheet generally illustrating an ammonium phosphate plant incorporating the present invention.

FIG. 1 generally illustrates the process flow sheet for a typical ammonium phosphate plant incorporating the clarified primary scrubber liquid system of the present invention.

In a typical ammonium phosphate plant phosphoric acid 10 of about 46% P$_2$O$_5$ and primary scrubber liquid 44 containing typically about 30% P$_2$O$_5$ is pumped to a vertical cylindrical reactor 20. In the reactor the phosphoric is reacted with either gaseous or liquid ammonia 12. An ammonium phosphate slurry 21 is produced in the reactor and is pumped to a granulator 22 which is normally either a rotating drum or a pugmill. The slurry 21 is distributed on dry recycled ammonium phosphate granules 27 and is further ammoniated 14.

The wetted granules 23 are discharged from the granulator 22 into a rotary dryer 24 which removes the excess water by evaporation. The dried granules 25 are then separated according to granular size by a sizing operation such as screening 26 with the product size granules 29 cooled (not shown) and sent to product storage 28, and the off size particles 27 recycled back to the granulator 22.

During the ammoniation steps in both the reactor 20 and the granulator 22, off-gases 30 and 32, respectively, are discharged and sent to the primary scrubbers 34. Also sent to the primary scrubbers are the off-gases (not shown) from the dryer 24 and the size separation and cooling equipment (not shown). In the primary scrubber or scrubbers, the off-gases 30 and 32 from the reactor and granulator along with the off-gases from the dryer, size separation and cooling equipment are scrubbed with phosphoric acid 16, which can range from about 27% to about 40% P$_2$O$_5$, to remove the ammonia and ammonium phosphate dust.

The tail gases 36 from the primary scrubber are then scrubbed in the tail gas scrubber 38 with contaminated water 40 to remove the fluorides. The scrubbed tail gas 22 can then be discharged to the atmosphere.

The primary scrubber liquid 44 which contains, inter alia, the iron, aluminum and magnesium phosphates is removed from the primary scrubber or scrubbers 34 and the entire stream or part of it 46 is sent to a clarifier 48 for clarification and removal of at least a portion of the precipitated impurities. The clarification process can be accomplished by any known method such as by settling, filtration or centrifuging, but preferably the precipitated impurities 54 are removed from the primary scrubber liquid by a solid bowl centrifuge.

Normally, the P$_2$O$_5$ content of the primary scrubber liquid 44 is between about 27% and about 32%, but it can range all the way up to about 40%.

The temperature of the primary scrubber liquid 44 during clarification can range from the abient air temperature to boiling, but is preferable between about 140° and about 160° F.

The N:P$_2$O$_5$ mole ratio of primary scrubber liquid 44 will preferably be between about 0.5 and about 1.2. However, for a more complete removal of the impurities, the mole ratio can be increased until the amount of ammonia removed with the impurities becomes uneconomical or until the viscosity of the primary scrubber liquid increases to a point where it cannot be pumped.

The clarified primary scrubber liquid 52 is fed into the reactor 20 together with any unclarified primary scrubber liquid 50.

The precipitated impurities removed from the clarified liquid are comprised primarily of complexed iron, aluminum and magnesium phosphates and a small amount of nitrogen. Because of the relatively small volume and the low nitrogen content of these impurities, the impurities can be consumed, for example, in a triple superphosphate plant.

One of the more remarkable aspects of using the clarified primary scrubber liquid system is that there are two effective ways to control the impurity content of the ammonium phosphates product. The first way is by controlling the amount of primary scrubber liquid directed to the clarifier. This achieves control of the ratio of unclarified to clarified primary scrubber liquid fed into the reactor.

Figure 4:
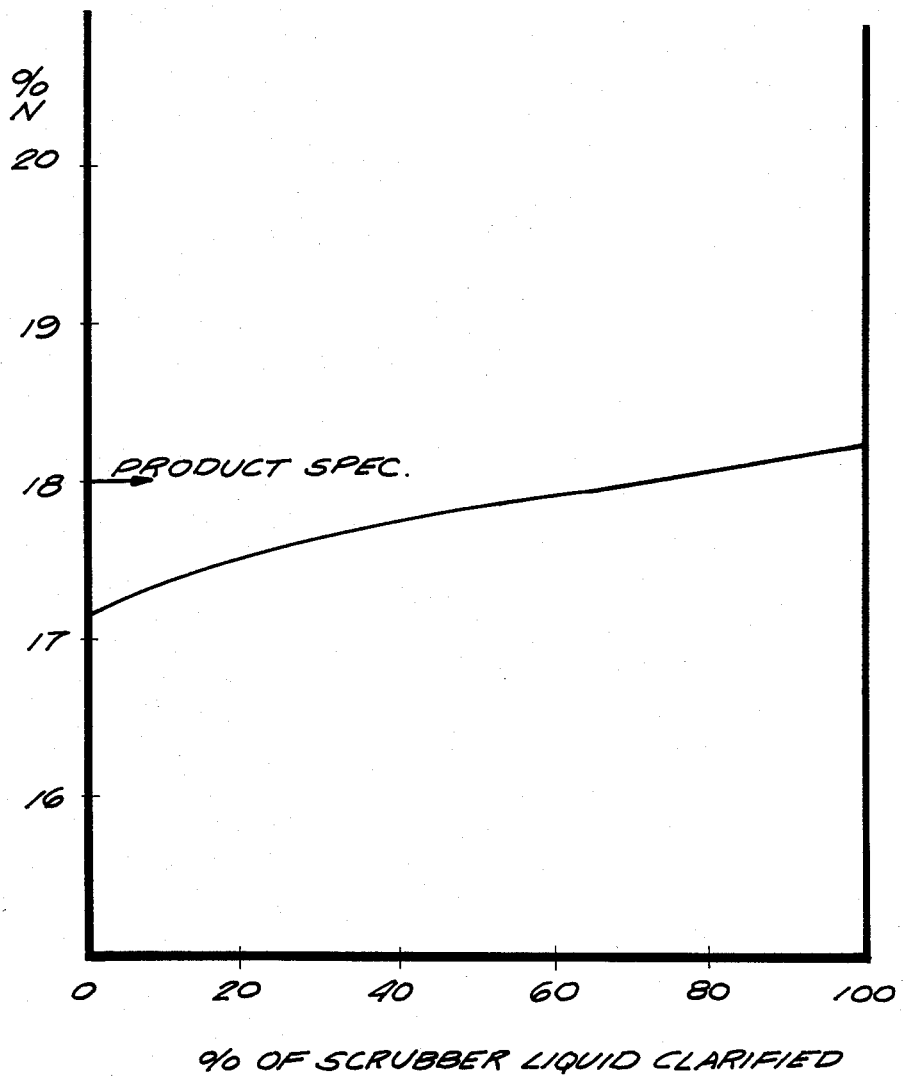
FIG. 4 is a graph illustrating the effect of varying the ratio of clarified to unclarified primary scrubber liquid on the N content of the ammonium phosphates product.

FIG. 4 illustrates graphically the effect of varying the ratio of unclarified to clarified liquid on the N content of the ammonium phosphate product. The particular data shown in FIG. 4 was obtained by using primary scrubber liquid having a N:P mole ratio of 0.78 and containing approximately 32%. P$_2$O$_5$ and 1%Fe. The impurities were removed with a pilot scale solid bowl centrifuge at approximately 140° F.

The graph of FIG. 4 clearly illustrates the beneficial effect of using clarified primary scrubber liquid. As the amount of clarified primary scrubber liquid increases from 0% to 100%, the N content in the final product increases.

Figure 3:
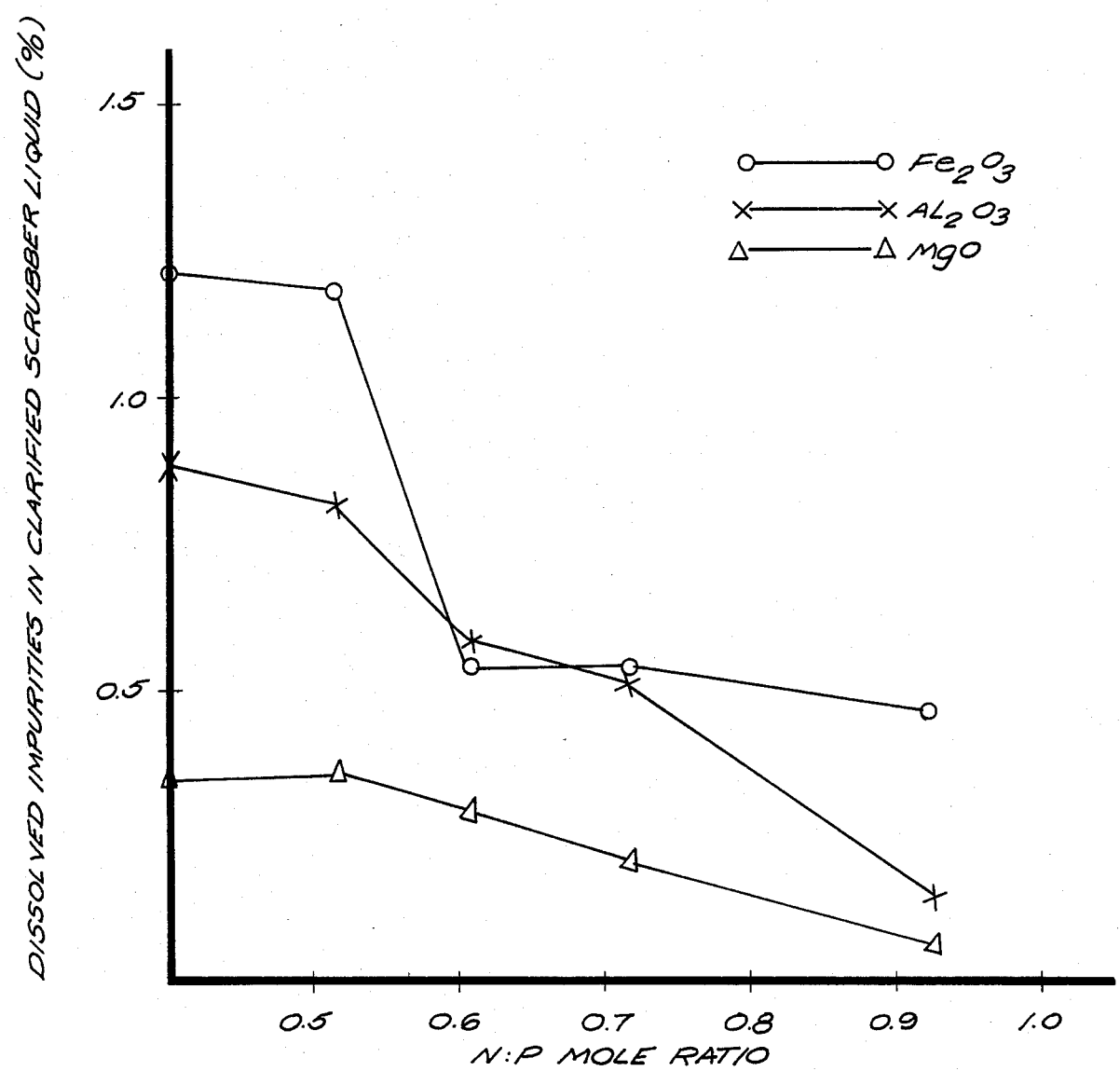
FIG. 3 is a graph illustrating the relationship between the N:P mole ratio of the primary scrubber liquid and the percent of dissolved impurities remaining in the the primary scrubber liquid after clarification.

The second way of controlling the purity of the final product is to control the N:P$_2$O$_5$ mole ratio of the primary scrubber liquid sent to the clarifier. This is illustrated by FIG. 3. The N:P mole ratio of the primary scrubber liquid is primarily a function of the ammonia concentration in the off-gases from the reactor and granulator. Normally, this ratio is maintained between about 0.5 and about 1.2 and as can be seen this ratio has an unexpectedly remarkable bearing on the amount of impurities removed by centrifuging.

Figure 2:
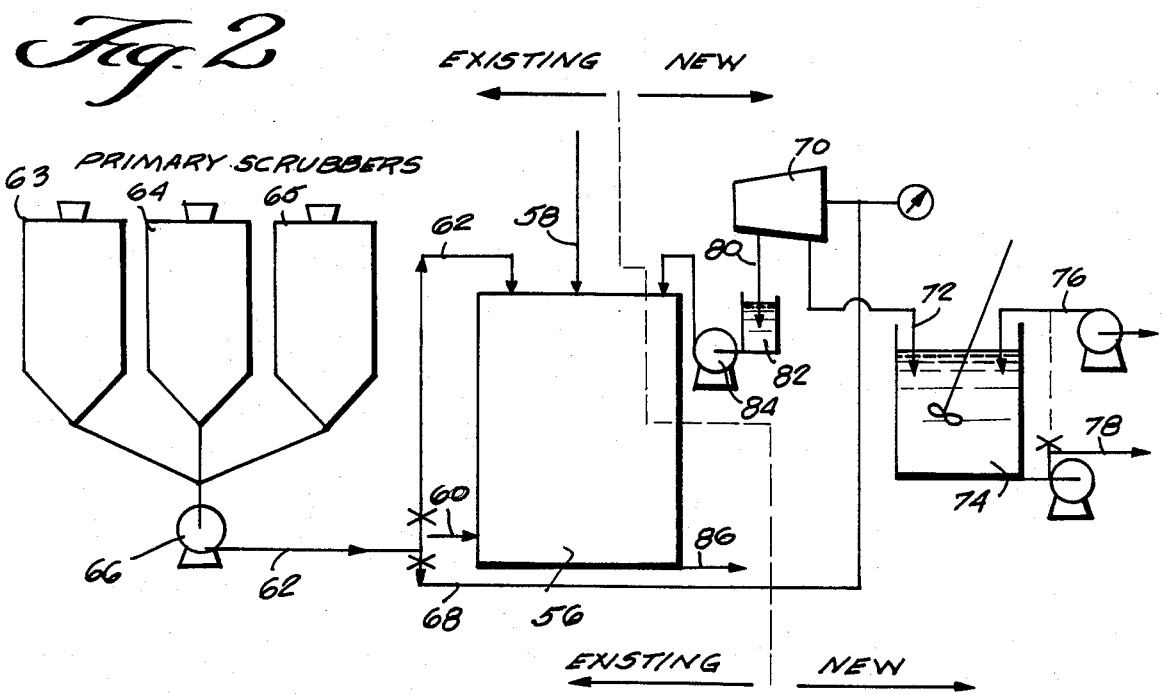
FIG. 2 is a flow sheet generally illustrating the flow of the clarified primary scrubber liquid.

FIG. 2 is a generalized flow sheet showing the clarified primary scrubber liquid flow and its interface with an existing ammonium phosphate plant.

The existing Di-Mon reactor 56 is fed with 46% P$_2$O$_5$ phosphoric acid 58 and ammonia gas 60. Also fed into the reactor 56 via pump 66 is the primary scrubber liquid 62 from the primary scrubbers which consists of a reactor/granulator scrubber 63, cooler and equipment scrubber 64 and dryer scrubber 65. In the existing installation all of the primary scrubber liquid is unclarified.

Modification of the existing plant is accomplished by splitting off from the primary scrubber liquid flow 62 a separate flow 68 which is pumped to a solid bowl centrifuge 70. The solids discharged 72 from the centrifuge which contains the separated out impurities is discharged into a repulping tank 74 where it is mixed with 43% $P_2O_5$ phosphoric acid 76 from a triple supersphosphate plant. The slurry of acid and cake 78 is returned to the triple superphosphate plant.

The clarified primary scrubber liquid 80 from the centrifuge 70 is directed to a surge tank 82 from which it is pumped via pump 84 into the reactor 56.

The di-ammonium phosphate slurry 86 is discharged from the reactor and sent to the granulator (not shown) for further treatment and processing as described in conjunction with FIG. 1.

As discussed above, wet process phosphoric acid is produced by decomposing natural phosphate rock with sulfuric acid and filtering off the precipitated calcium sulfate. Depending upon the quality of the phosphate rock processed, the resulting crude phosphoric acid solution contains varying amounts of impurities such as iron, aluminum, magnesium, calcium and other metals in the form of their phosphates. These impurities act as diluents during the manufacture of ammoniated phosphate fertilizers and often prevent obtaining the required grade specifications pertaining to nitrogen and available phosphate content.

The present invention provides a processing step that can be integrated into existing ammonium phosphate plants and permits the partial and controlled removal of the above-mentioned impurities. For economic reasons it is beneficial to remove only as much of the impurities as is necessary to insure the grade specification of the desired di-ammonium or non-ammonium phosphate products.

To remove the impurities from the phosphoric acid by physical means, i.e., centrifugation or filtration, etc., they must first be precipitated. This occurs in the primary scrubbers where phosphoric acid is used to remove and recover ammonia, primarily from the reactor and granulator off-gases. The degree of ammoniation, of which the N:P mole ratio is an indicator, determines the completeness of the precipitation. As can be seen on FIG. 3, an increase in the N:P mole ratio causes more impurities to precipitate and allows their removal by clarification.

The impurities remaining in solution (not being precipitated) at a given N:P mole ratio remain constant regardless of the initial impurity content of the scrubber liquid. This is shown on Table 1.

It follows that the quantity of impurities removed from the scrubber liquid is a function of:

(a) The initial impurities content of the scrubber liquid;
(b) The N:P mole ratio of the scrubber liquid;
(c) The amount of scrubber liquid clarified;
and
(d) The efficiency of the clarifying equipment (filter, centrifuge, etc.).

The process of the present invention will be elucidated by the following non-restrictive examples.

EXAMPLES

Example 1

Synthetic primary scrubber liquids were prepared by partial ammoniation of phosphoric acids having various $Fe_2O_3$ contents. Table I below shows the compositions of the synthetic primary scrubber liquids before and after ammoniation and separation of the precipitated impurities in a laboratory scale clinical centrifuge. The data indicates that regardless of initial impurity content of the scrubber liquid the N:P ratio determines the concentration of impurities remaining dissolved in the clarified scrubber liquid.

TABLE I

| Primary Scrubber Feed | | | | Primary Scrubber Discharge, Clarified | | |
|---|---|---|---|---|---|---|
| % $P_2O_5$ | % $Fe_2O_3$ | % $Al_2O_3$ | Slurry N:P Mole Ratio | % $P_2O_5$ | % $Fe_2O_3$ | % $Al_2O_3$ |
| 28.36 | 1.34 | 0.85 | 0.92 | 23.36 | 0.45 | 0.08 |
| 28.12 | 1.80 | 0.84 | 0.93 | 23.76 | 0.40 | 0.06 |
| 28.04 | 2.58 | 0.85 | 0.93 | 24.26 | 0.46 | 0.15 |

Example 2

Synthetic primary scrubber liquids were prepared by ammoniating phosphoric acid to various N:P mole ratios, and by separating the precipitated impurities in a laboratory scale clinical centrifuge. The data shown in Table II and plotted as FIG. 3 indicate that the concentration of impurities remaining in the clarified scrubber liquid is a function of the N:P mole ratio and decreases as the mole ratio is increased.

TABLE II

| N:P Mole Ratio | Clarified Scrubber Liquid | | | | % Impurity Removal | | |
|---|---|---|---|---|---|---|---|
| | % $P_2O_5$ | % $Fe_2O_3$ | % $Al_2O_3$ | % MgO | $Fe_2O_3$ | $Al_2O_3$ | MgO |
| 0 | 26.29 | 1.22 | 0.89 | 0.36 | | | |
| 0.52 | 26.29 | 1.18 | 0.82 | 0.36 | 3.3 | 7.9 | 0 |
| 0.61 | 26.29 | 0.54 | 0.58 | 0.28 | 55.7 | 34.8 | 22.0 |
| 0.72 | 26.29 | 0.54 | 0.52 | 0.21 | 55.7 | 41.6 | 41.7 |
| 0.93 | 26.29 | 0.47 | 0.15 | 0.07 | 61.5 | 83.2 | 80.6 |

Example 3

Primary scrubber liquid from a commercial Di-Ammonium Phosphate Plant having a N:P mole ratio of 0.72 and a temperature of 140° F. was processed through a Sharples Super-D-Canter solid bowl centrifuge at a feed rate of 2.5 gpm. The composition of the liquid before and after centrifugation is shown in Table III. FIG. 4 shows the calculated N-content of the granulated di-ammonium phosphate product resulting from the clarification of all or part of the primary scrubber liquid.

Example 4

Primary scrubber liquid from a commercial Di-Ammonium Phosphate Plant having a N:P mole ratio of 0.72 and a temperature of 135°–140° F. was processed through a Sharples Super-D-Canter solid bowl centrifuge at various feed rates. The data tabulated in Table III show that the removal of impurities from the scrubber liquid declines with an increase in feed rate to the centrifuge. Also shown is the effect of feed rate on the calculated N-content of the granulated di-ammonium phosphate product (assuming the entire scrubber liquid stream was clarified and the granulated product moisture was 2%).

TABLE III

| N:P Mole Ratio | Centrifuge Feed Rate (GPM) | Impurities in Clarified Liquid | | | % Impurity Removal | | | N-Content* of D-Mon Product (%) |
|---|---|---|---|---|---|---|---|---|
| | | % $Fe_2O_3$ | % $Al_2O_3$ | % MgO | $Fe_2O_3$ | $Al_2O_3$ | MgO | |
| 0.72 | 2.5 | 0.40 | 0.15 | 0.18 | 72.0 | 76.6 | 67.3 | 18.25 |
| 0.72 | 5 | 0.73 | 0.25 | 0.25 | 49.0 | 60.9 | 54.6 | 18.11 |
| 0.72 | 9 | 0.90 | 0.32 | 0.32 | 37.1 | 50.0 | 41.8 | 18.02 |
| 0.72 | 10 | 0.92 | 0.30 | 0.32 | 35.7 | 53.1 | 41.8 | 18.03 |
| 0.72 | 15 | 0.94 | 0.32 | 0.33 | 34.3 | 50.0 | 40.0 | 18.04 |
| 0.72 | Centrifuge F | 1.43 | 0.64 | 0.55 | 0 | 0 | 0 | 17.17 |

*Calculated

What is claimed is:

1. Process for the partial removal of impurities including $Fe_2O_3$ $Al_2O_3$, and MgO, in a primary scrubber liquid produced in the primary scrubbers of an ammonium phosphate plant comprising the steps of,
   (a) discharging the primary scrubber liquid containing impurities from the primary scrubbers, said liquid having a N:P mole ratio of between about 0.5 and about 1.2, and a $P_2O_5$ content between about 27% and about 40%, and,
   (b) clarifying all or part of said discharged primary scrubber liquid to remove at least a portion of said impurities.

2. Process in accordance with claim 1 wherein the clarification of step (b) is accomplished by centrifuging.

3. Process in accordance with claim 1 wherein the temperature of the primary scrubber liquid during clarification is maintained between ambient conditions and boiling.

4. Process is accordance with claim 3 wherein the temperature is maintained between about 140° and about 160° F.

5. Process in accordance with claim 1 wherein the $P_2O_5$ content is between about 27% and about 32%.

6. Process for the partial removal of impurities including $Fe_2O_3$ $Al_2O_3$, and MgO, from the primary scrubber liquid produced in the primary scrubbers of an ammonium phosphates plant comprising the steps of,
   (a) reacting ammonia with phosphoric acid in a reactor to produce an ammonium phosphate slurry and reaction off-gases,
   (b) discharging said slurry into a granulator wherein recycled dry granules of ammonium phosphate are wetted with slurry,
   (c) ammoniating said wetted granules in said granulator,
   (d) drying said wetted granules of step (c),
   (e) sizing said dried granules into product size granules and off-size granules,
   (f) recycling at least a portion said off-size granules to said granulator for wetting with said slurry,
   (g) cooling said product size granules,
   (h) scrubbing the reaction off-gas and the off-gases obtained in steps (c) (d) and (g) in a primary scrubber with phosphoric acid thereby removing ammonia, and ammonium phosphates dust, to form a primary scrubber liquid having a N:P mole ratio of between about 0.5 and about 1.2, and a $P_2O_5$ content between about 27% and about 40%,
   (i) discharging said primary scrubber liquid from said primary scrubber,
   (j) clarifying all or part of said flows to remove said impurities and form a clarified primary scrubber liquid,
   (k) discharging said impurities, and
   (l) feeding at least a portion of said clarified liquid into said reactor.

* * * * *